United States Patent
Ayyar et al.

(10) Patent No.: US 8,171,121 B2
(45) Date of Patent: May 1, 2012

(54) METHOD, SYSTEM, AND APPARATUS FOR DYNAMIC RECONFIGURATION OF RESOURCES

(75) Inventors: Mani Ayyar, Cupertino, CA (US); Eric Delano, Fort Collins, CO (US); Ioannis T. Schoinas, Portland, OR (US); Akhilesh Kumar, Sunnyvale, CA (US); Jay Jayasimha, Sunnyvale, CA (US); Jose A. Vargas, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 12/236,047

(22) Filed: Sep. 23, 2008

(65) Prior Publication Data

US 2009/0019267 A1     Jan. 15, 2009

Related U.S. Application Data

(62) Division of application No. 11/011,300, filed on Dec. 13, 2004, now Pat. No. 7,734,741.

(51) Int. Cl.
*G06F 15/177* (2006.01)
*G06F 15/76* (2006.01)

(52) U.S. Cl. ............................ 709/221; 712/15; 709/223

(58) Field of Classification Search ........................ None
See application file for complete search history.

(56) References Cited

U.S. PATENT DOCUMENTS

| | | | |
|---|---|---|---|
| 4,646,075 A | 2/1987 | Andrews et al. |
| 5,007,163 A | 4/1991 | Pope et al. |
| 5,265,207 A | 11/1993 | Zak et al. |
| 5,315,533 A | 5/1994 | Stich et al. |
| 5,367,658 A | 11/1994 | Spear et al. |
| 5,406,209 A | 4/1995 | Johnson et al. |
| 5,422,914 A | 6/1995 | Snyder |
| 5,598,348 A | 1/1997 | Rusu |
| 5,784,599 A | 7/1998 | Elkhoury |
| 5,815,299 A | 9/1998 | Bayart et al. |
| 5,852,631 A | 12/1998 | Scott |
| 6,119,255 A | 9/2000 | Akram |
| 6,182,253 B1 | 1/2001 | Lawrence et al. |
| 6,189,106 B1 | 2/2001 | Anderson |

(Continued)

FOREIGN PATENT DOCUMENTS

CN     1107266     8/1997

(Continued)

OTHER PUBLICATIONS

Office Action for U.S. Appl. No. 11/011,300 mailed Oct. 7, 2008, 11 pgs.

(Continued)

*Primary Examiner* — Idriss N Alrobaye
(74) *Attorney, Agent, or Firm* — Blakely, Sokoloff, Taylor & Zafman LLP

(57) ABSTRACT

A dynamic reconfiguration to include on-line addition, deletion, and replacement of individual modules of to support dynamic partitioning of a system, interconnect (link) reconfiguration, memory RAS to allow migration and mirroring without OS intervention, dynamic memory reinterleaving, CPU and socket migration, and support for global shared memory across partitions is described. To facilitate the on-line addition or deletion, the firmware is able to quiesce and de-quiesce the domain of interest so that many system resources, such as routing tables and address decoders, can be updated in what essentially appears to be an atomic operation to the software layer above the firmware.

3 Claims, 4 Drawing Sheets

U.S. PATENT DOCUMENTS

| | | | |
|---|---|---|---|
| 6,275,905 B1 | 8/2001 | Keller et al. | |
| 6,292,215 B1 | 9/2001 | Vincent | |
| 6,311,281 B1 | 10/2001 | Pole et al. | |
| 6,311,298 B1 | 10/2001 | Norrie | |
| 6,321,276 B1 | 11/2001 | Forin | |
| 6,330,586 B1 | 12/2001 | Yates et al. | |
| 6,550,020 B1 | 4/2003 | Floyd et al. | |
| 6,557,069 B1 | 4/2003 | Drehmel et al. | |
| 6,650,155 B1 | 11/2003 | Nguyen et al. | |
| 6,725,317 B1 | 4/2004 | Bouchier et al. | |
| 6,728,668 B1 | 4/2004 | Kitamorn et al. | |
| 6,917,999 B2 * | 7/2005 | Kumar et al. | 710/302 |
| 6,985,502 B2 | 1/2006 | Bunton | |
| 6,996,657 B1 | 2/2006 | Chambers et al. | |
| 7,000,101 B2 | 2/2006 | Wu et al. | |
| 7,010,607 B1 | 3/2006 | Bunton | |
| 7,051,218 B1 | 5/2006 | Gulick et al. | |
| 7,065,688 B1 | 6/2006 | Moyes et al. | |
| 7,117,311 B1 * | 10/2006 | Rankin et al. | 711/146 |
| 7,146,510 B1 | 12/2006 | Helms et al. | |
| 7,174,467 B1 | 2/2007 | Helms et al. | |
| 7,484,125 B2 * | 1/2009 | Wei | 714/36 |
| 7,493,438 B2 * | 2/2009 | Kaushik et al. | 710/302 |
| 7,509,403 B1 | 3/2009 | Lee et al. | |
| 7,555,671 B2 | 6/2009 | Nachimuthu et al. | |
| 7,647,490 B2 * | 1/2010 | Wei et al. | 713/1 |
| 7,673,090 B2 * | 3/2010 | Kaushik et al. | 710/302 |
| 7,721,341 B2 * | 5/2010 | England et al. | 726/27 |
| 7,761,696 B1 | 7/2010 | Bhattacharyya et al. | |
| 7,822,900 B2 * | 10/2010 | Kaushik et al. | 710/302 |
| 2001/0053694 A1 | 12/2001 | Igarashi et al. | |
| 2002/0059501 A1 | 5/2002 | McKinney et al. | |
| 2002/0095610 A1 | 7/2002 | Nunomura | |
| 2002/0138225 A1 | 9/2002 | Wong et al. | |
| 2003/0005200 A1 * | 1/2003 | Kumar et al. | 710/302 |
| 2003/0023771 A1 | 1/2003 | Erickson et al. | |
| 2003/0037224 A1 | 2/2003 | Oehler et al. | |
| 2003/0058872 A1 | 3/2003 | Berggreen et al. | |
| 2003/0065752 A1 * | 4/2003 | Kaushik et al. | 709/220 |
| 2003/0115513 A1 | 6/2003 | Harriman | |
| 2003/0120913 A1 | 6/2003 | Wu et al. | |
| 2003/0163753 A1 | 8/2003 | Lu et al. | |
| 2003/0167367 A1 * | 9/2003 | Kaushik et al. | 710/302 |
| 2004/0120302 A1 | 6/2004 | Sebire et al. | |
| 2004/0133756 A1 | 7/2004 | Shaw et al. | |
| 2004/0193706 A1 | 9/2004 | Willoughby et al. | |
| 2004/0193916 A1 | 9/2004 | Kamada et al. | |
| 2004/0196865 A1 | 10/2004 | Natarajan et al. | |
| 2004/0215911 A1 | 10/2004 | Ouren et al. | |
| 2004/0236798 A1 | 11/2004 | Srinivasan et al. | |
| 2004/0260910 A1 * | 12/2004 | Watt et al. | 712/43 |
| 2005/0022059 A1 * | 1/2005 | Wei | 714/36 |
| 2005/0044219 A1 | 2/2005 | Lewis et al. | |
| 2005/0144476 A1 * | 6/2005 | England et al. | 713/200 |
| 2005/0235166 A1 * | 10/2005 | England et al. | 713/193 |
| 2005/0259696 A1 | 11/2005 | Steinman et al. | |
| 2006/0018280 A1 | 1/2006 | Kumar et al. | |
| 2006/0041696 A1 | 2/2006 | Cherukuri et al. | |
| 2006/0184480 A1 | 8/2006 | Ayyar et al. | |
| 2006/0209722 A1 | 9/2006 | Takeo et al. | |
| 2008/0307082 A1 | 12/2008 | Cai et al. | |
| 2009/0100203 A1 * | 4/2009 | Wei | 710/46 |
| 2009/0106471 A1 * | 4/2009 | Kaushik et al. | 710/302 |
| 2010/0217949 A1 | 8/2010 | Schopp et al. | |

FOREIGN PATENT DOCUMENTS

| | | |
|---|---|---|
| JP | 7182225 | 7/1995 |
| WO | WO-03054713 | 7/2003 |

OTHER PUBLICATIONS

Office Action for Chinese Patent Application No. 200510119157.7 mailed Dec. 14, 2007, 49 pgs.

Office Action for Chinese Patent Application No. 200510119157.7 mailed May 30, 2008, 11 pgs.

Office Action for Chinese Patent Application No. 200510119157.7 mailed Jul. 13, 2007, 6 pgs.

Final Office Action from U.S. Appl. No. 11/011,300 mailed Jan. 23, 2009, 11 pgs.

Office Action for Chinese Patent Application No. 200710188727.7 mailed Oct. 16, 2009, 1 pg.

Office Action for Chinese Patent Application No. 200710188727.7 mailed May 6, 2010, 1 pgs.

Office Action for Chinese Patent Application No. 200710188725.8 mailed Jan. 22. 2010, 7 pgs.

Notice of Allowance for U.S. Appl. No. 11/011,300 mailed Jan. 25, 2010, 9 pgs.

Office Action for Chinese Patent Application No. 200510107388.6 mailed Nov. 23, 2007, 16 pgs.

Final Office Action from U.S. Appl. No. 11/011,801 mailed May 5, 2009, 10 pgs.

First Office Action for Chinese Patent Application No. 200810090191.9 mailed Sep. 18, 2009, 6 pgs.

Office Action for Chinese Patent Application No. 200510107388.6 mailed Jun. 19, 2009, 7 pgs.

Office Action from U.S. Appl. No. 11/011,300 mailed Jun. 18, 2009, 13 pgs.

Office Action from U.S. Appl. No. 11/011,801 mailed Aug. 3, 2009, 10 pgs.

Second Office Action for Chinese Patent Application No. 200710188725.8 mailed Oct. 12, 2010, 11 pgs.

Second Office Action for Chinese Patent Application No. 200710188726.2 mailed Nov. 9, 2010, 5 pgs.

First Office Action for Chinese Patent Application No. 200710188726.2 mailed Apr. 15, 2010, 4 pgs.

Office Action from U.S. Appl. No. 12/235,968 mailed Sep. 28, 2010, 12 pgs.

Office Action from U.S. Appl. No. 12/348,723 mailed Sep. 16, 2010, 21 pgs.

Notice of Allowance from U.S. Appl. No. 11/011,801 mailed Apr. 27, 2010, 4 pgs.

Final Office Action from U.S. Appl. No. 12/348,723 mailed Jan. 12, 2011, 27 pgs.

Final Office Action from U.S. Appl. No. 12/235,968 mailed Feb. 16, 2011, 7 pgs.

Second Office Action for Chinese Patent Application No. 200810090191.9 mailed Jul. 4, 2011, 9 pgs.

Third Office Action for Chinese Patent Application No. 200710188726.2 mailed Apr. 3, 2011, 10 pgs.

Office Action for U.S. Appl. No. 12/236,222 mailed May 12, 2011, 18 pgs.

* cited by examiner

METHOD, SYSTEM, AND APPARATUS FOR DYNAMIC RECONFIGURATION OF RESOURCES

RELATED APPLICATIONS

This application is a divisional of U.S. patent application Ser. No. 11/011,300 filed Dec. 13, 2004 now U.S. Pat. No. 7,734,741.

This application is related to U.S. patent application Ser. No. 11/011,801 filed Dec. 13, 2004.

BACKGROUND OF THE INVENTION

1. Field of the Invention

The present invention relates to systems that support either or both of online addition and deletion of system resources and/or reconfiguration operations. For example, the present invention facilitates dynamically allocating system resources between multiple Operating Systems (OS) partitions.

2. Description of the Related Art

Current systems are based on the Front Side Bus (FSB) do not permit hot plug of an individual bus component. In contrast, newer versions of bus technology do support addition and deletion of system resources but are limited to coarse granularity, such as, requiring all the processors on the FSB along with the system control chipset.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

Figure 1:
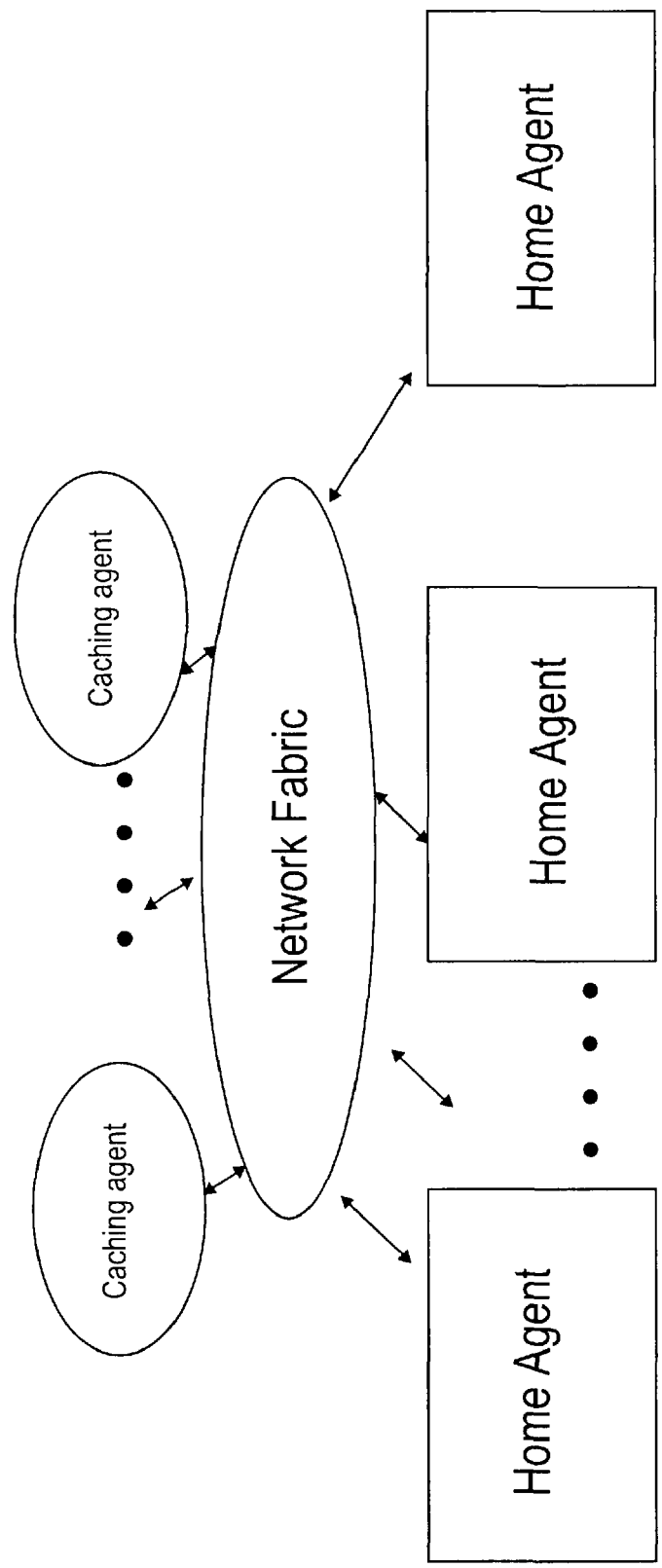
FIG. 1 is a protocol architecture as utilized by one embodiment.

A method, apparatus, and system for fine grain dynamic reconfiguration for a high speed point to point network (pTp) is described In the following description, for purposes of explanation, numerous details are set forth in order to provide a thorough understanding of the present invention. However, it will be apparent to one skilled in the art that these specific details are not required in order to practice the present invention.

An area of current technological development relates to reliability, availability, and serviceability (RAS) and dynamic reconfiguration. As previously described, current systems are based on the Front Side Bus (FSB) do not permit hot plug of an individual bus component. In contrast, newer versions of bus technology do support addition and deletion of system resources but are limited to coarse granularity, such as, requiring all the processors on the FSB along with the system control chipset. In contrast, the claimed subject matter facilitates dynamic reconfiguration to include on-line addition, deletion, and replacement of individual modules of to support dynamic partitioning of a system, interconnect (link) reconfiguration, memory RAS to allow migration and mirroring without OS intervention, dynamic memory reinterleaving, CPU and socket migration, and support for global shared memory across partitions. To facilitate the on-line addition or deletion, the firmware is able to quiesce and de-quiesce the domain of interest so that many system resources, such as routing tables and address decoders, can be updated in what essentially appears to be an atomic operation to the software layer above the firmware. The claimed subject matter facilitates operation of dynamic configuration by utilizing Running System and/or a System Service Processor. A Running System has been introduced in an Application Note in 2002, Node Hot-Plug on Itanium® Architecture-Based Systems.

In one embodiment, a running system comprises of the system resources that are already operational when a new element is added in the system/domain or they will remain operational when an element is removed from the system/domain Definitions In one embodiment, a quiesced state is a state where there are no protocol transactions in the full system or a subset thereof except those generated by firmware and/or service system processors.

In one embodiment quiescence is a set of actions done by firmware or system service processors to ensure that the full system or a subset thereof reach quiescence.

In one embodiment, a module may be comprised of CPUs, crossbars, memory and memory controllers, IO Hub, or any combination of the preceding. In this embodiment, the combination of preceding modules may be based on the particular platform configuration.

In one embodiment, the pTp architecture is defined by Intel's Common System Interface (CSI) and supports a layered protocol scheme. Figure one illustrates one example of a cache coherence protocol's abstract view of the underlying network. One example of a cache coherence protocol is described in pending application P18890 filed in 2004.

As previously described, the claimed subject matter facilitates the on-line addition or deletion based at least in part on the firmware to be able to quiesce and de-quiesce the domain of interest so that many system resources, such as routing tables and address decoders, can be updated in what essentially appears to be an atomic operation to the software layer above the firmware. Several examples of quiesce and de-quiesce for IA 32 and Itanium processors with platform dependent configurations or with a System Service Processor are described in the next several paragraphs In one embodiment, the firmware ensures that a single quiescence operation at most is in progress at any time within a domain. In another embodiment, multiple quiescence operations are permissible in a system with multiple domains. For example, a quiescence operation is initiated either by a particular core (in-band), by the SSP (out-of-band). The SSP can control the quiescence through its non-CSI network or can designate a core, which then follows in the in-band flow.

For multipartition systems, the firmware has the option of quiescing each partition (sub-domain) and declaring quiescence after each partition (sub-domain) is quiesced or quiescing the domain as a whole by appropriate programming of the Input/Output Hub (IOH) scope register and related data structures.

Locks are not allowed while the quiescence operation is in progress (in 32-bit Intel Architecture (IA-32 platforms). This can be ensured, for example, by first brining all the processors in the domain to System Management Mode (SMM) through a System Management Interrupt (SMI) operation.

Quiescence/Dequiescence Using System Service Processor (SSP)

The SSP could be used instead of the inband flows described earlier The SSP may employ out-of-band buses such as SMBus and JTAG to program the processor and the IOH registers and check their status. The flows then proceed in a manner similar to the previously described flows except that there the functions performed by the "initiating core" are now performed by the SSP. Alternatively, the SSP may send an PMI/SMI to the initiating core and then rely completely on the inband management flows to effect quiescence/dequiescence.

For example, FIG. 1 is a protocol architecture as utilized by one embodiment. The architecture depicts a plurality of caching agents and home agents coupled to a network fabric. For example, the network fabric adheres to a layered protocol scheme and may comprise either or all of: a link layer, a physical layer, a protocol layer, a routing layer, a transport layer. The fabric facilitates transporting messages from one protocol (home or caching agent) to another protocol for a point to point network. In one aspect, the figure depicts a cache coherence protocol's abstract view of the underlying network.

Figure 2:
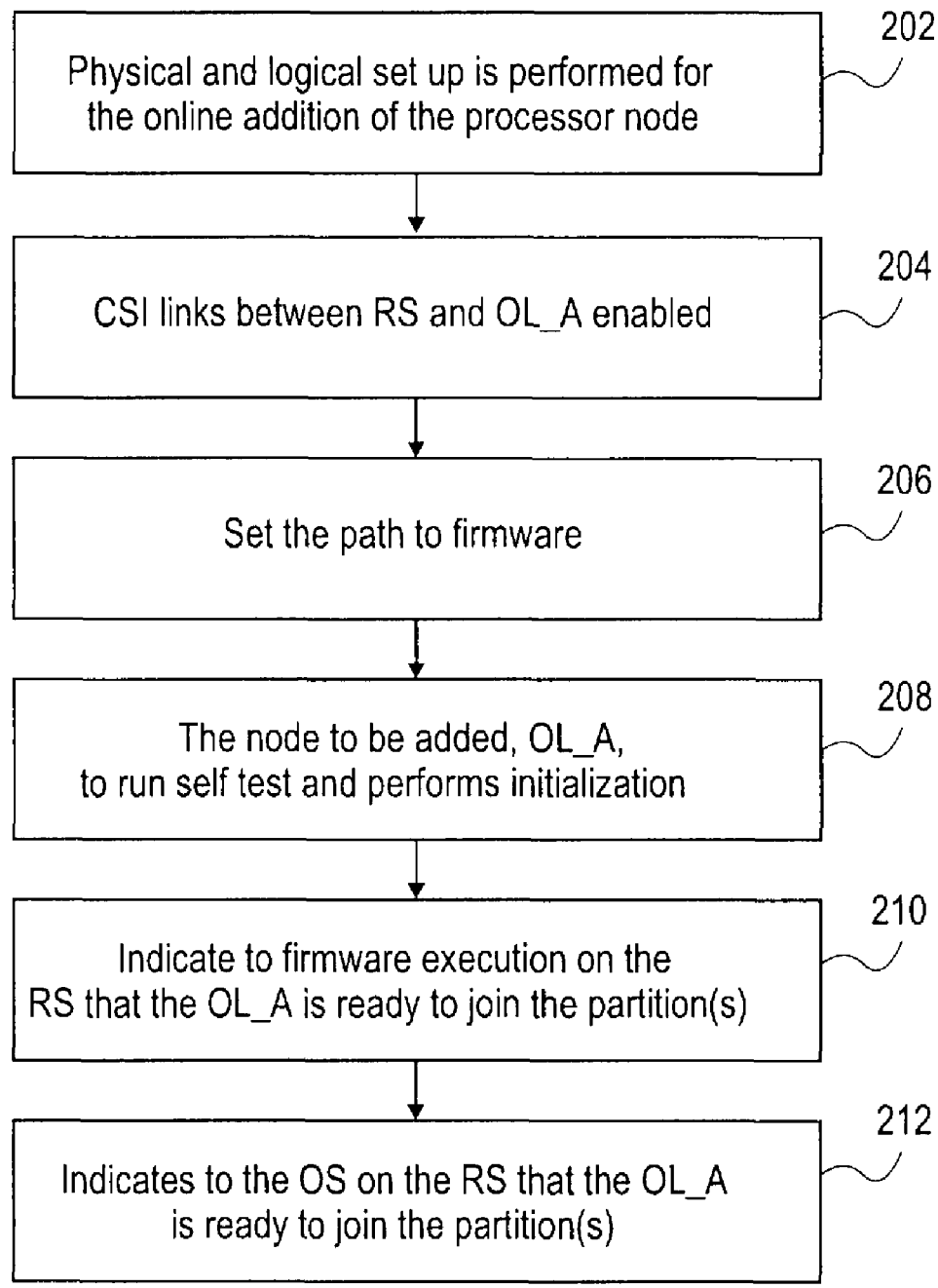
FIG. 2 illustrates a flow diagram for a method for online addition of a resource as utilized by an embodiment.

FIG. 2 illustrates a flow diagram for a method for online addition of a resource as utilized by an embodiment. The figure depicts one method for the flow for online addition of resource that may be performed by inband firmware (firmware running on the CPU) or a system service processor (SSP) or a combination of both. In this embodiment, the online resource that is added is a processor Node, with or without other entities)

Initially, the physical and logical set up is performed for the online addition of the processor node. For example, the System Service Processor (SSP) and/or the RS firmware is aware of the platform topology and the CSI links to which the processor node, on line addition (OL_A), will be connected. In one embodiment, it sets up the appropriate link controllers on the RS for the following information: {NodeID, AgentType and Crossbar Port number} for each CSI entity present on the node(s) to which the OL_A is being connected. Likewise, it also programs one or more configuration entities on the RS associated with such CSI links, to generate a Power Management Interrupt/System Management Interrupt (PMI/SMI) interrupt to one or more processor entities on the RS when link initialization is completed.

In one embodiment, the arming of PMI/SMI interrupt is not performed where the OL_A node is part of the RS with already active links. Such a situation arises, for example, when a processor entity is logically removed from one partition and added to another.

Subsequently, the processor node is inserted by either physically done or through the SSP that grants permission to include an existing node into a OS partition as the new processor node (OL_A node). If a physical insertion is involved, the insertion triggers a power on reset sequence on the OL_A node and the out-of-band signals on the OL_A are enabled (SMBus, JTAG, etc.) and at this point, the SSP is capable of accessing a Control Status Register (CSR) resources on the OL_A.

In one embodiment, the CSR is defined for each link. For example, it reflects the state of a link port and progress of link initialization. This CSR can be queried by the system management channels or in-band firmware to verify a variety of conditions related to a link's status: link is connected to a remote component, idle flits detected, idle flit acknowledgment detected, link initialization status, enable CSI link initialization and framing sequence, etc. In one embodiment, the CSR is accessible through the configuration space.

If an SSP is present, it sets up the OL_A's link controllers with the triplets of {NodeID, AgentType, and Crossbar Port number} for each CSI entity present on each Field Replacement Unit (FRU) being added to the RS. In the absence of the SSP, the firmware (or microcode) on the OL_A performs this function. The firmware on the OL_A or the configuration agent within the OL_A may read some platform signals or strapping pins to derive their own NodeID information.

The flow proceeds to a next block 204 that enables the CSI links between RS and the node to be added, OL_A. For example, the detailed information for enabling the link will be discussed in the next several paragraphs.

The SSP or the firmware on the RS issues a command to the link controller to perform the physical and Link layer initialization and exchange of Link/Protocol layer parameters. At the end of a successful link initialization, each side of the link latches the information about the CSI entities present on the other end of the link, i.e., triplets of {NodeID, AgentType and Crossbar Port number}.

This step is not done if the OL_A is already part of the system and the link is active.

One or more processor entities on the RS receive PMI/SMI in recognition of the OL_A event. There may be some CSI links between various CSI entities within the OL_A nodes that also need to be initialized. The firmware execution on the RS proceeds with the integration of the OL_A when all the expected CSI links are operational. In a multi-partition RS, the firmware execution on the RS that receives the PMI/SMI interrupt is aware of the partition to which the OL_A is integrated and passes on the PMI/SMI indication to the firmware execution on the right partition, if necessary. Such an indication may be signaled by a write to a CSR on the target that generates the PMI/SMI, or using a platform resource, or using the SSP.

The PMI/SMI interrupt generation due to OL_A event does not occur where the OL_A node is part of the RS with already active links (e.g., route-through OL_A). The OL_A can signal a PMI/SMI to the RS as described above.

At this point, the RS is capable of accessing the CSR resources of the OL_A.

This step is firmware and platform implementation dependent. The system interface may provide a mechanism by which the OL_A components are set to a Halt state awaiting a wake up by the RS. Such an indication may be provided with the use of Boot mode straps that are read by the OL_A at Reset de-assertion, or using system/socket layer parameters during Link layer parameter exchange, or by the SSP setting CSR values of the OL_A's configuration agent.

The SSP and/or the firmware execution on the RS co-operate to set up the Route Table, Address Decoders and other CSI structures on both the RS and OL_A components. At the end of this programming, the OL_A can access full/limited resources on the RS. Firmware can be designed to protect common resources such as the interconnect fabric from errant accesses by the OL_A until the OL_A components are tested successfully.

The flow proceeds to a next block 206 that sets the path to firmware. For example, the detailed information for setting the path to firmware will be discussed in the next several paragraphs.

Each processor core needs a path to the firmware entity. If the OL_A complex has a firmware entity, it can be used. If the OL_A node gets connected to a firmware entity on the RS, that firmware entity can be used by the OL_A. If neither of these options are available, firmware accesses from the OL_A can be routed through a node on the RS which acts as a conduit to the firmware entity. In such a situation, the SSP or the firmware on the RS sets up the address decoders and route tables on the OL_A nodes to route firmware accesses.

The SSP or the firmware execution in the RS writes to an implementation dependent CSR on the OL_A to release it from halt state, if the OL_A is waiting for such a signal. They may also provide some configuration values in platform resources, such as HotAdd indication to limit the scope of platform discovery by the OL_A.

The flow proceeds to a next block 208 that allows the new node to be added, OL_A, to run self test and performs initialization. For example, the detailed information for running self test and initialization will be discussed in the next several paragraphs.

Each processor core on the OL_A tries to become the node boot strap processor (NBSP). In one possible implementation, the winner may be decided using a simple race to set a predetermined configuration register flag.

In some architectural configurations, the firmware running on the NBSP also initializes and enables some functionality of the memory bridge or the memory controller. The NBSP initializes and tests memory, if present, on the OL_A node. The size and memory gap information is communicated to the OL_A by the SSP/firmware on the RS, using configuration registers or other implementation dependent platform resources.

Additional core initialization and testing which requires scratch pad memory is completed. The firmware on the OL_A mode and the firmware on the RS communicate with each other using IPIs or implementation dependent platform resources. If the OL_A node has no local memory, its memory needs can be satisfied by memory on the RS. Such memory is mapped as non-coherent on both RS and OL_A as the OL_A nodes are not part of the RS's coherency domain yet. Non-coherent accesses also insulate the RS from errant accesses by the OL_A.

If the OL_A is expected to boot an independent OS, the OL_A node has its own memory and the co-ordination between the firmware executions on the RS and the OL_A is not applicable.

The flow proceeds to a next block 210 that indicates to firmware execution on the RS that the OL_A is ready to join the partition(s) For example, the detailed information will be discussed in the next several paragraphs.

If the OL_A is expected to join an existing OS partition, the firmware execution on the OL_A sends an indication to the firmware execution on the RS. The firmware executions on either end exchange information in an implementation dependent manner. The firmware on the RS becomes aware of the health of the processors on the OL_A, the memory and I/O Hub resources added by the OL_A.

If the OL_A causes changes to the route tables of any partitions within the RS (or optionally, the entire RS), the firmware performs a quiesce of all the CSI entities on affected partitions, updates the route tables and then wakes up the quiesced CSI entities. Similarly, the Route tables of the OL_A are programmed/re-programmed as necessary. Also, refer to Section 14.3.5, "Need for a Quiesce During OL_* Events" for further details.

If the OL_A is expected to form a new partition, it is woken up if necessary and the firmware execution on the OL_A proceeds to boot its OS.

The rest of the steps below describe the scenario where the OL_A will be joining an existing partition.

The OL_A and the RS update their system address maps and address decoders to incorporate the new resources. The RS may need to revise the participant lists (for snoops, interrupt broadcast, Lock, etc.) in various CSI entities of the OS partition. If these lists are not revised in an atomic or consistent manner, protocol violations may occur.

The firmware executions on the RS and the OL_A processor nodes interact using implementation specific mechanisms and enable coherence traffic with each other.

The firmware execution in the OL_A nodes informs the firmware execution on the RS of the boot progress, then waits in a loop for a wake up by the partition's Os.

The flow proceeds to a next block 212 that indicates to the OS on the RS that the OL_A nodes are ready to join the partition(s): For example, the detailed information will be discussed in the next several paragraphs.

The firmware execution on the RS builds appropriate ACPI tables and generates an interrupt to the OS using ACPI mechanisms, to notify the addition of the resources. If resources are being added to multiple OS partitions, the firmware on the RS will send the interrupts to multiple partitions.

The OS identifies the resources of the OL_A node using ACPI methods/interfaces. If I/O Hub, bridges and devices were added, the OS will load the appropriate device drivers for the newly added resources on the I/O Hub. If memory was added, the OS may begin using such memory.

The OS wakes up the processors on the OL_A node and executes the OS initialization steps on such processors.

In another embodiment, the online resource that is added is a memory only node. In this embodiment, the flow is similar to the one depicted in connection with FIG. 2. However, the differences are depicted in the next few paragraphs.

The memory node is powered on and the out-of-band signals, if any, are enabled. The SSP or the configuration agent within the OL_A memory node sets up its link controllers with the triplets of {NodeID, AgentType, and Crossbar Port number} for each CSI entity present on the FRU being added to the RS.

During Link/Protocol layer initialization, the RS recognizes the addition of a memory entity from the AgentType parameter exchange.

The addition of the OL_A memory entity generates a PMI/SMI to the firmware execution on the RS.

If the OL_A causes changes to the route tables of any partitions within the RS, the firmware may need to perform a quiesce of all the CSI entities on such partitions (or optionally, the entire RS), update the route tables and then wake up the quiesced CSI entities. Typically, a pure memory entity is a leaf node and route table changes to the RS can be made without a quiesce. Also, refer to Section 14.3.5, "Need for a Quiesce During OL_* Events" for further details.

The SSP/firmware on the RS initializes and tests memory on the OL_A node.

The RS updates its system address map and address decoders to incorporate the new resources. The target address decoders at the memory entity are set up to address the newly added memory.

The firmware execution on the RS builds appropriate ACPI tables and generates an interrupt to the OS using ACPI mechanisms, to notify the addition of resources. If resources are being added to the multiple OS partitions, the firmware on the RS will send the interrupts to multiple partitions.

The OS(s) on the RS integrates the memory with the OS partition(s).

In another embodiment, the online resource that is added is only an I/O Hub node. In this embodiment, the flow is similar to the one depicted in connection with FIG. 2. However, the differences are depicted in the next few paragraphs.

The SSP or the configuration agent within the OL_A node sets up its link controllers with the triplets of {NodeID, AgentType, and Crossbar Port number} for each CSI entity present on the FRU being added to the RS.

During Link/Protocol layer initialization, the RS recognizes the addition of an I/O Proxy entity from the Agent-Type parameter exchange.

The addition of the OL_A I/O Proxy entity generates a PMI/SMI to the firmware on the RS.

If the OL_A changes the route tables of any partitions within the RS, firmware performs a quiesce of all the CSI entities on such partitions (or optionally, the entire RS) and then update the route tables.

The RS determines the MMIO and I/O address ranges required for the downstream busses and devices. It updates its system address map and address decoders to incorporate the new resources. The target address decoders at the OL_A I/O Proxy entity are set up to address the newly added MMIO and I/O resources and the source address decoders at the I/O Proxy entity are set up to address the RS memory and processor resources.

The participant lists for Snoop at various CSI entities is revised to include the OL_A I/O Proxy entity, if such an entity is a caching agent. Similarly, if the OL_A were to act as the Lock_Master, the appropriate CSRs on various CSI entities are initialized.

The CSI entities that were quiesced are then woken up.

The firmware execution on the RS builds appropriate ACPI tables and generates an interrupt to the OS using ACPI mechanisms, to notify the addition of resources. If resources are being added to multiple OS partitions, the firmware on the RS will send the interrupts to multiple partitions.

The OS(s) on the RS recognizes the OL_A event, probes the I/O busses downstream of the I/O Hub, discovers devices, loads appropriate device drivers for such devices and then integrates the devices with the OS partition(s).

Figure 3:
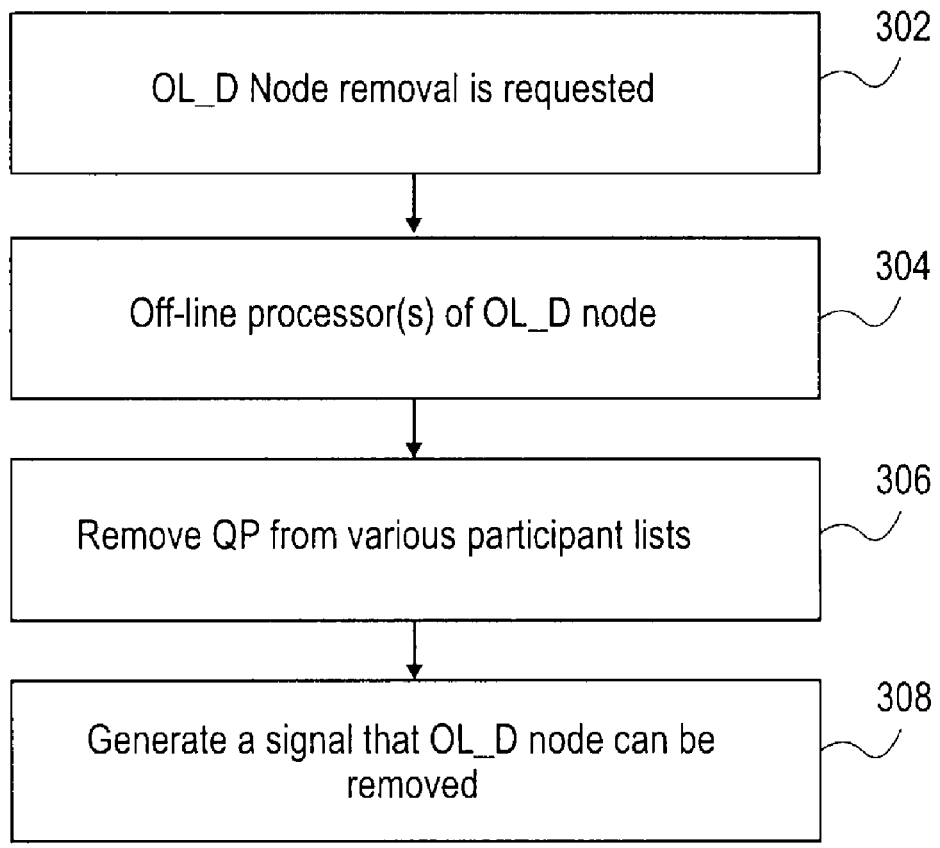
FIG. 3 illustrates a flow diagram for a method for online deletion of a resource as utilized by an embodiment.

FIG. 3 illustrates a flow diagram for a method for online deletion of a resource as utilized by an embodiment. In this discussion, OL_D is the node which is deleted from the RS. Depending on the system configuration, in one embodiment, the OL_D node could be a) processor(s) with memory and I/O, b) processor(s) with memory, c) processor(s) only, d) I/O Hub only, e) Memory only. The deletion procedure is explained through a series of steps in the next several paragraphs. In this figure, a deletion of a processor node is described.

A removal of the particular processor node, OL_D, is requested, as depicted by a block 302. For example, in one embodiment, the request is made to the OS through system management channels.

Subsequently, the actions for the Off-line processor(s) of OL_D node are described, as depicted by a block 304. For example, the information follows in the next few paragraphs.

Following actions are taken on various processors (actions by the Quiesced Processor (QP) and RS are identified separately).

(QP) The OS moves applications, interrupts away from the QP processor and stops scheduling work in the QP. It also disables interrupts on the QP.

(QP) Stop prefetches and speculative accesses by removal of TLBs. Stopping prefetch avoids errors due to references to memory that may be mapped out by address decoder changes.

(QP) The OS uses an ACPI mechanism to signal that is no longer using the QP node and the ACPI mechanism enters the firmware layer in an implementation dependent manner. Then firmware layer does the following:

On IA-32 systems, revise the appropriate participant lists to ensure that the QP is not the target of subsequent VLW, Lock and broadcast IPI transactions.

Firmware ensures that any interrupt transactions in-transit are pended to the QP. This step is implementation dependent and may involve polling various I/O Hubs in the system for pending interrupts. The reads to IOHs causes draining of outstanding interrupts from the IOHs. The firmware execution on the QP must send a PMI IPI to itself and verify receipt of the PMI. This ensures that any earlier interrupts and IPIs are delivered to the QP core. If new interrupts are pending, firmware returns to the OS and the OS is expected to initiate the set of actions starting with Step 2.

On Itanium processors, the firmware stops pre-fetches to its memory areas accessed in writeback with limited speculation (WBL) memory attribute, using the PAL_Prefetch_Visibility procedure.

Firmware performs flush of processor and platform caches, and invokes necessary instruction to flush the Write Coalescing (WC) buffers.

Executes from firmware space to avoid reliance on RS memory.

On Itanium processors, invokes the PAL_SHUTDOWN procedure with the option to write an IPI to the RS with delivery type of PMI. On IA-32, generates an IPI to RS with delivery type of SMI IPI followed by the necessary steps to reach the lowest power system sleep state. Alternatively, the firmware on the QP may create a regular vectored interrupt (e.g., SCI) to the OS on the RS and expect the OS on the RS to enter the firmware to perform the functionality described in connection with block 306 below.

After this stage, any occurrence of MCA/INIT/PMI/SMI events does not wake up the cores. Only a Reset event can wake up such sleeping cores.

Subsequently, the removing QP from various participant lists is described, as depicted by a block 306. For example, the information follows in the next few paragraphs.

(RS) The firmware on the RS does the following on receipt of the above PMI/SMI IPI:

Perform a quiesce to ensure all in-transit transactions such as snoops to the QP are completed.

Remove the QP from various participant lists on the RS.

Remove QP from directory/snoop-filter structures, if any.

Change Address Decoders of the QP such that firmware and data accesses don't get out of the QP node.

Remove QP references from the firmware data structures for the partition. MCA on the RS is no longer reflected to the QPs.

If the QP nodes are physically removed from the system, the firmware takes actions to remove the Crossbar also. Removal of Crossbar involves changes to routing tables on multiple CSI nodes to bypass the QP node. Refer to Section 14.7, "Multi-Partition Management with Shared Interconnect" for multiple options for accomplishing these changes. Further, in a system with hard partitions, if the links from OL_D to the RS were to be disabled, Route tables updates will be necessary. In such cases, the firmware may need to perform a quiesce of the affected CSI entities on the RS, update the route tables and then wake up the quiesced CSI entities. Also, refer to Section 14.3.5, "Need for a Quiesce During OL_* Events" for further details.

Wake up the quiesced CSI entities on the RS.

Notify the OS on the RS of successful removal completion using a ACPI mechanism (e.g., using SCI interrupt).

Subsequently, the generation of a signal that OL_D node can be removed is described, as depicted by a block 308. For example, the information follows in the next few paragraphs.

(RS) The OS receives the interrupt from the firmware to indicate that the OL_D is complete. It may provide the completion indication to a SSP/system management application if the action was initiated by it. If physical removal of the OL_D node(s) are required, the OS may run some ACPI methods to provide a visual indication, e.g., turn on a LED on the removal slot.

In the previously described embodiment, the processor node was removed. In another embodiment, the resource that is removed is a memory only node. Further detail is discussed in the next few paragraphs.

The OS migrates applications and device drivers using the memory being removed to other memory segments. The OS may flush pageable memory to disk, or if enough spare memory is available, copy the OL_D memory contents to another region of memory. There are some situations requiring the following actions:

If the memory being removed is assigned to a Direct Memory Access (DMA) device, the device driver must be shut down or assigned to a new buffer.

If the OS design permits, the OS can remap the kernel memory area, which is part of the memory being off-lined, to other on line memory.

If memory is interleaved and the memory interleave granularity (across CSI nodes) is smaller than an OS page, then memory from multiple CSI nodes that share the same OS page as the OL_D node, will need to be paged to disk. In the extreme case, all of pageable memory in partition will need to be paged to disk.

Special interactions with firmware are required for areas accessed by the OS in physical addressing mode such as the OS_MCA, OS_INIT entry points registered with the SAL. Similar requirement exists for firmware memory areas accessed in physical addressing mode (merely copying to a different physical address will not work).

The OS stops pre-fetches and speculative accesses to memory being removed using removal of TLBs and then transfers control to the firmware layer.

On Itanium processors, the firmware stops pre-fetches to its memory being off lined, using the PAL_Prefetch_Visibility procedure.

The firmware flushes the processor and platform caches for the address range.

If I/O Proxy entities have caches, the firmware takes steps to drain such caches and cause update of memory.

The firmware performs a quiesce operation to ensure completion of in-transit transactions to removed resources. A loose timeout can also work. A pure Memory node that does not perform route-through functions is a leaf node, hence a quiesce can be avoided if route table changes on the RS are merely the removal of entries for the memory be removed.

The firmware then changes the Address decoders on CSI entities to avoid references to removed resources. The OS would see a "hole" in its address space and must not generate a request to the off-lined memory in future.

Firmware then releases any quiesced CSI entities on the RS to resume their operation.

Firmware notifies the OS of removal completion using ACPI mechanisms and the OS may provide platform indications such as signaling the SSP or turning on a LED, etc.

If the Memory node is shared by multiple OS partitions, the steps are done on all such partitions.

In the previously described embodiment, the memory only node was removed. In another embodiment, the resource that is removed is a I/O Hub Node. Further detail is discussed in the next few paragraphs.

The OS takes actions to stop using resources being removed, then calls firmware to modify the platform resources controlled by the firmware. The firmware removes references to resources in CSI structures such as Address decoders, Participant lists, etc., then notifies the OS of completion. These steps are described below:

The OS notifies device drivers of I/O devices being removed. If a device driver cannot be shut down, it will reject the request and the OS will not proceed with the removal. Such a rejection may have impact on removal of other resources from the system. For example, if the device driver has been assigned a memory buffer for DMA operations and the device driver cannot relinquish such a buffer, the memory node associated with the buffer cannot also be removed.

If the device drivers are stopped, OS reclaims the memory associated with their code and data areas. The OS then gives control to the firmware layer using ACPI mechanisms to perform actions such as the following:

If I/O Proxy entities have caches, the firmware takes steps to drain such caches and cause update of memory.

The firmware performs a quiesce operation and ensures completion of in-transit transactions to removed resources.

On IA-32 systems, if the removed I/O Hub functioned as a Lock_Master, designate another Lock_Master, set up the Lock_Scope register on the new Lock_Master, and revise the Lock_Target registers on various CSI entities on the RS. Similar steps are required if the removed I/O Hub maintained broadcast lists for interrupt delivery (physical destination with destination shorthand or logical destination in flat/cluster addressing mode), and such broadcast functionality has to be migrated to another I/O Hub.

Revise the Address decoders on RS's CSI entities to avoid references to the removed resources.

Remove the I/O Hub CSI entity as a target from Participant lists such as Snoop, Directory, Snoop-filter, etc.

Firmware then releases any quiesced CSI entities on the RS to resume their operation.

Firmware notifies the OS of removal completion using ACPI mechanisms.

If the I/O node is part of multiple OS partitions (such as an IOH shared by multiple OS partitions), these steps are done on all such partitions.

Figure 4:
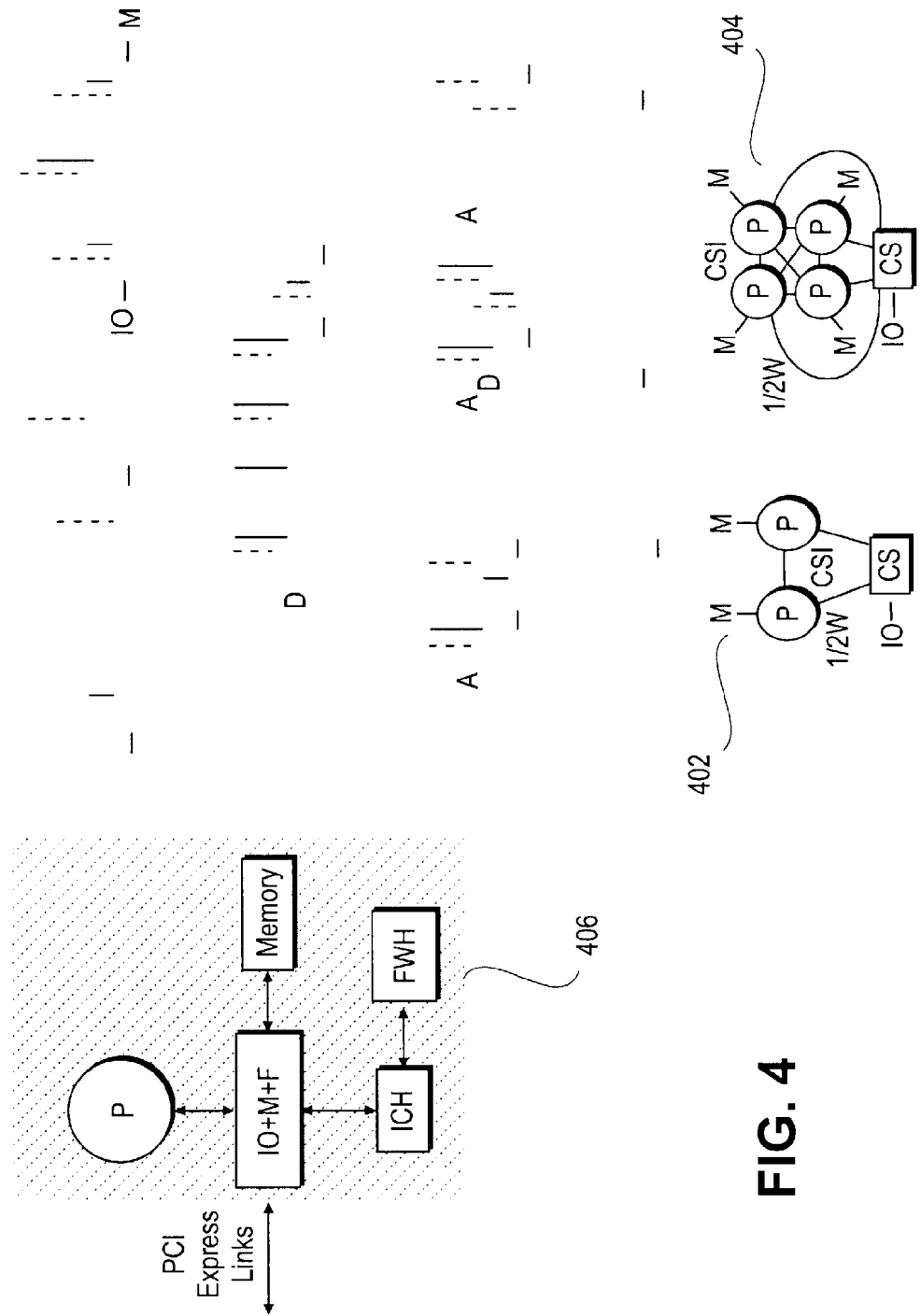
FIG. 4 is multiple embodiments of a system.

FIG. 4 depicts a point-to-point system with one or more processors. The claimed subject matter comprises several embodiments, one with one processor 406, one with two processors (P) 402 and one with four processors (P) 404. In embodiments 402 and 404, each processor is coupled to a memory (M) and is connected to each processor via a network fabric may comprise either or all of: a link layer, a protocol layer, a routing layer, a transport layer, and a physical layer. The fabric facilitates transporting messages from one protocol (home or caching agent) to another protocol for a point-to-point network. As previously described, the system of a network fabric supports any of the embodiments depicted in connection with FIGS. 1-3.

For embodiment 406, the uni-processor P is coupled to graphics and memory control, depicted as IO+M+F, via a network fabric link that corresponds to a layered protocol scheme. The graphics and memory control is coupled to memory and is capable of receiving and transmitting via PCI Express Links. Likewise, the graphics and memory control is coupled to the ICH. Furthermore, the ICH is coupled to a firmware hub (FWH) via a LPC bus. Also, for a different uni-processor embodiment, the processor would have external network fabric links. The processor may have multiple cores with split or shared caches with each core coupled to a Xbar router and a non-routing global links interface. Thus, the external network fabric links are coupled to the Xbar router and a non-routing global links interface.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for on-line deletion of a processor node comprising:
   requesting the removal of the processor node to an operating system through system management channels;
   moving applications away from processors and memory being offlined with respect to the processor node that is requested for removal with the operating system;
   moving interrupts away from the processor node and disabling interrupts to the processors being offlined with the operating system;
   stopping prefetches and speculative accesses by removal of translation lookaside buffers (TLBs) to avoid errors due to references to memory that are mapped out by address decoder;
   performing a quiesce operation to ensure that in-transit snoop operations are completed, wherein a quiesced state is a state where there are no protocol transactions in the full system or a subset thereof except those generated by firmware and/or service system processors;
   removing the processor node that is requested for removal from one or more participant lists; and
   generating a signal that the processor node that is requested for removal can be physically removed.

2. The method of claim 1, wherein moving applications away from processors and memory being offlined with respect to the processor node that is requested for removal is performed by an Operating System (OS).

3. (The method of claim 1, wherein the processor node may contain IA-32 or ITANIUM processors.

\* \* \* \* \*